UNITED STATES PATENT OFFICE.

WILLIAM WALL, OF NEW YORK, N. Y., ASSIGNOR TO THE UNITED STATES COTTON SEED CLEANING COMPANY, OF SAME PLACE.

REMOVING FIBER FROM COTTON-SEED.

SPECIFICATION forming part of Letters Patent No. 310,628, dated January 13, 1885.

Application filed November 15, 1883. (No specimens.)

*To all whom it may concern:*

Be it known that I, WILLIAM WALL, of New York, in the county of New York and State of New York, have invented a new and useful Improvement in Treatment of Cotton-Seed; and I do hereby declare that the following is a full, clear, and exact description of the same.

My invention relates to the treatment of cotton-seed for the removal of the fiber remaining upon the seed. Its object is to improve the condition of the seed, to facilitate the operation, and to economize in the use of the acid. In the main features my process is the same as that described in Letters Patent granted Thomas Taylor on the 15th day of November, 1881. In the process described in said patent the seeds are subjected to the action of sulphuric acid until the fiber and outside woody parts of the shell are dissolved, and then the seed are transferred to a lime bath, and subsequently washed and agitated or rubbed.

In carrying out my invention I use sulphuric acid, the action of the acid dissolving the whole or the main part of the lint without permitting the acid to materially affect the hull. The subsequent washings, hereinafter more fully described, remove the dissolved lint or fiber and leave the seeds practically free from lint, in which condition they are available for the purposes for which they are used.

In the mode of operation described in the above-mentioned patent the seed are transferred directly from the acid to the lime bath. This treatment destroys the acid taken up by the seed, and consequently renders the process expensive and impracticable on account of the bulk of waste material or residue to be handled.

To remedy this is the object of my invention, and I have found by experiment that I may wash the seeds previous to the lime bath, and thus save the acid, as hereinafter described. For this purpose I transfer the seeds directly from the acid bath to a tank of pure water, in quantity preferably just sufficient to wash the seeds, whereby the larger part of the adhering acid is removed. I may immerse the seeds in a second bath of pure water, then in a lime or equivalent bath to remove all traces of acid, and finally in a bath of pure water, after which they may be dried. These are generally the steps taken; but the following is a more detailed description of the process and the results attained.

In the first or acid tank I ordinarily use acid of preferably 66° hydrometer strength, although I do not confine myself to any particular degree, or, in fact, to any particular acid. After the seeds are removed from the acid-tank they are immersed in a tank containing at first pure water, which removes the acid from the seed and from the receptacle in which they are contained, which acid is thus mixed with the water in the tank, raising it to, say, 10° hydrometer. The dissolved fiber and any loose cotton remaining on the seed are at the same time washed off, either wholly or partially, as desired, and remain in the water of this second tank. A repetition of the process—that is to say, the introduction of a second batch into the same water of the second tank—will increase the strength of the diluted acid, say, ten degrees more, and the process may be repeated with successive batches until the acid is raised in strength to, say, about 45° hydrometer, or any degree desired. A second tank of pure water may be used after the first water bath for the more complete carrying out of the process. The water mixed with acid or the acid reduced in strength by these washings is purified by passing it through sand, which removes the dissolved fiber or cotton-carbon that may be mixed with it. When the first water-tank, which is the second tank in the order of the whole, has been removed, the second water-tank may be put in its place until the strength of the acid in that has been brought up to the standard desired, and the process is carried on in this way by removal of tank No. 2, or the first water-tank, when the contents are raised to a sufficient degree of strength, and the substitution of the second water-tank, or tank No. 3, as heretofore described. I do not wish to be limited to the number of these water-tanks, as it may be found necessary to use more than two under some circumstances.

The cotton-carbon filtered from the acid is useful for the manufacture of fertilizer, being still charged with some acid. By this process there is a great saving in expense, inasmuch as a large amount of acid is saved and the whole utilized, whereas by former processes it was totally wasted.

The purified acid from the tanks Nos. 2 and 3 may be strengthened by the addition of fresh acid to any desired degree and again used for the first bath. In using this acid I have found by experiment that I may strengthen it to 60° hydrometer and heat it, and the effect upon the seed will be equally as good as the 66° described.

It will be understood that the condition of the seed will depend upon the length of time to which they are subjected to the process, and will be partially or wholly cleaned accordingly.

It will also be understood that I handle the seed in suitable cages, such as have been heretofore described and are well known, which cages containing the seed are dipped into the acid or other bath. I do not claim treating cotton-seed with acid and then rinsing the acid off with water, my invention, as above explained, being limited to the mode of operation by means of which the repeated rinsing by dipping in the bath of water after dipping in the acid is used to effect the saving of the acid in the manner described.

What I claim is—

The hereinbefore-described process of treating cotton-seed, whereby the charred fiber or carbon is removed and the acid saved for further use, consisting in dipping successive batches of the seed first in the tank containing acid, then in a tank or tanks containing at first pure water until the water contained in the tank or tanks is sufficienty charged with acid washed from the seed, together with the charred fiber, and then filtering said acid mixed with water through sand, all substantially as described.

In testimony whereof I have signed my name to this specification in the presence of two subscribing witnesses.

WILLIAM WALL.

Witnesses:
F. L. MIDDLETON,
L. W. SEELY.